July 19, 1966 P. R. ANDERSON 3,261,485
LOAD HANDLING DEVICE MOUNTED ON A VEHICLE WITH A FIFTH WHEEL
Filed Sept. 11, 1963 5 Sheets-Sheet 1
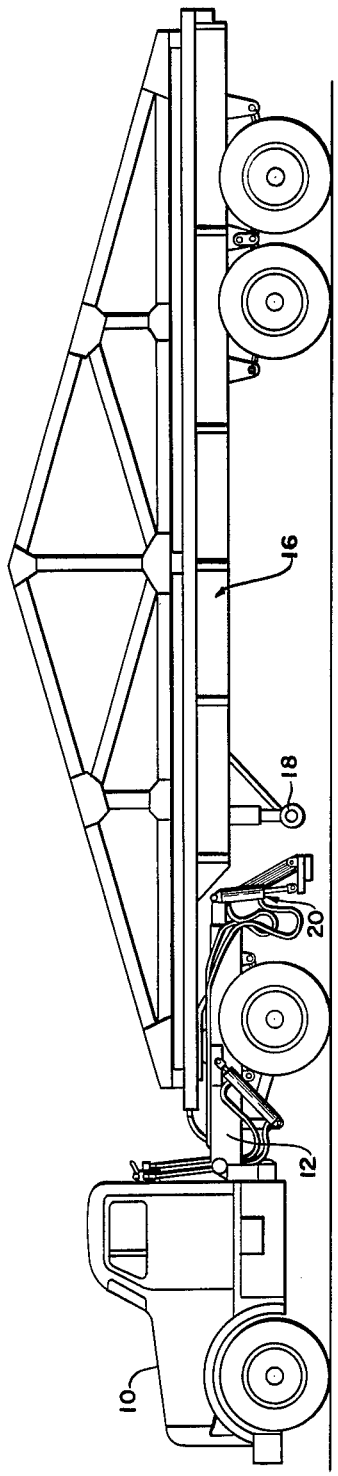
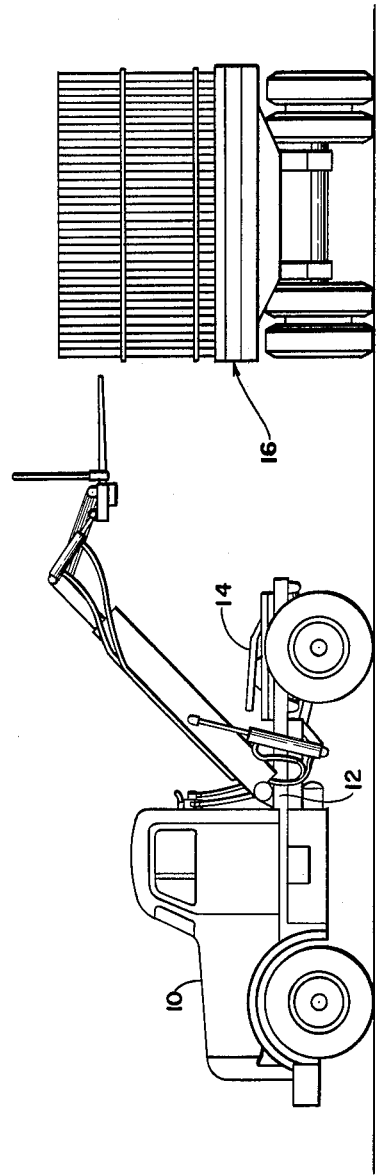
INVENTOR
Philip R. Anderson
BY *Stevens, Davis, Miller & Mosher*
ATTORNEYS

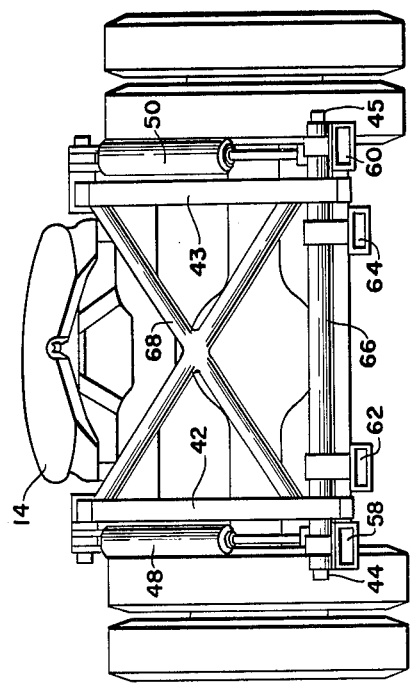

July 19, 1966  P. R. ANDERSON  3,261,485
LOAD HANDLING DEVICE MOUNTED ON A VEHICLE WITH A FIFTH WHEEL
Filed Sept. 11, 1963  5 Sheets-Sheet 3
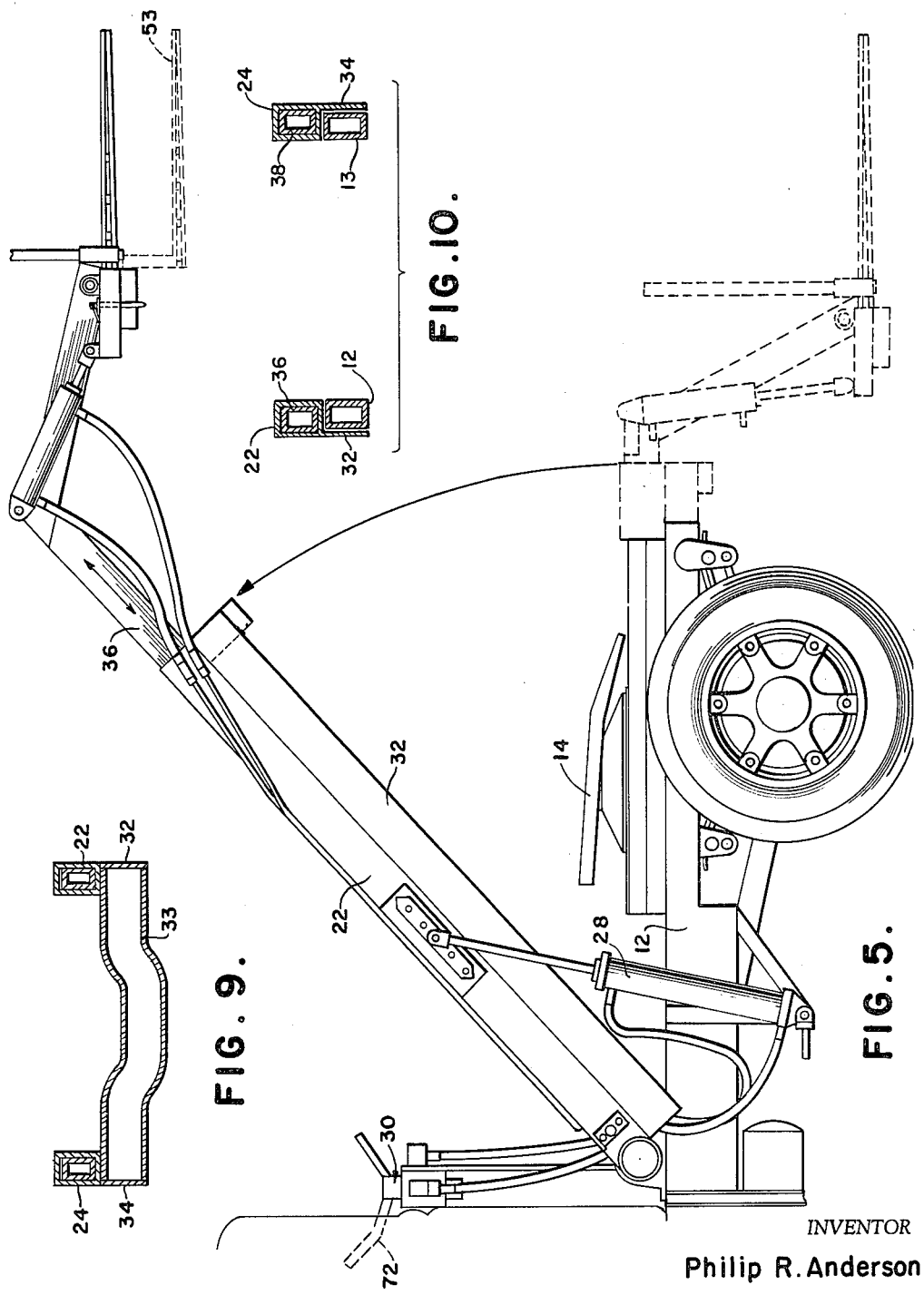
INVENTOR
Philip R. Anderson
BY
Stevens, Davis, Miller & Mosher
ATTORNEYS

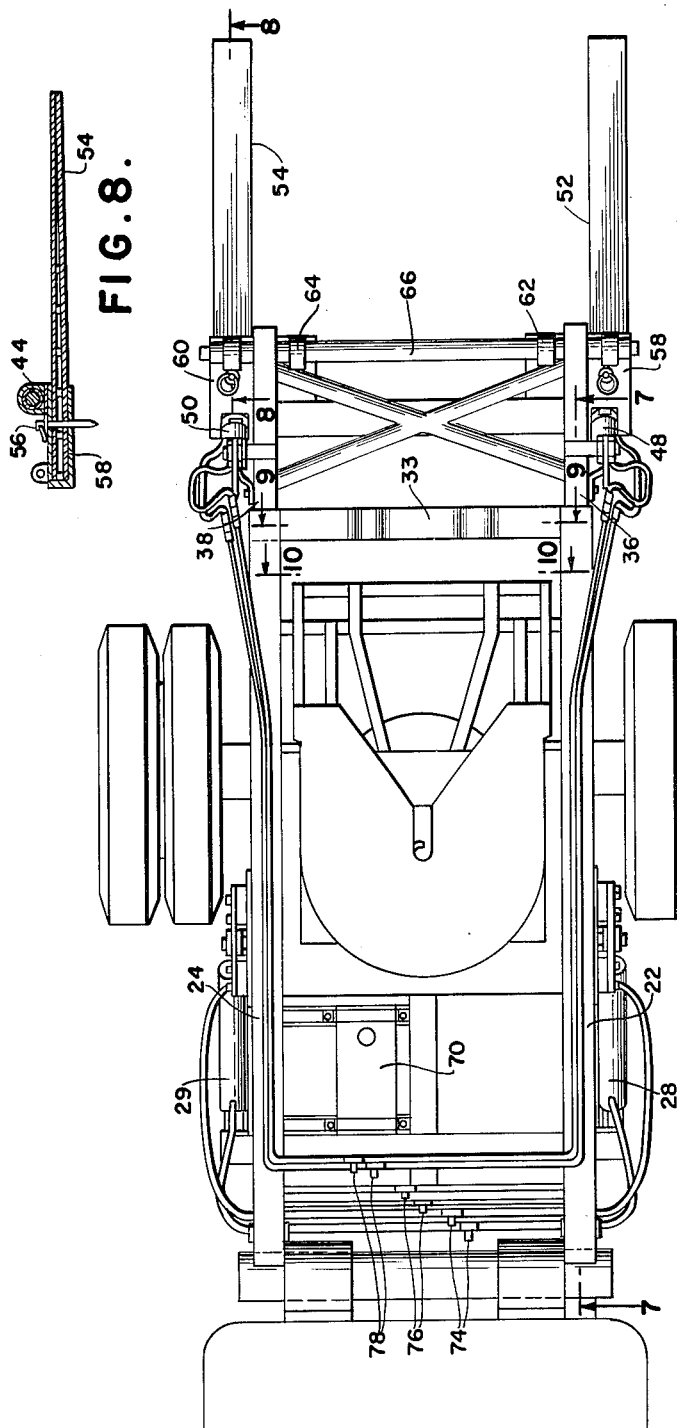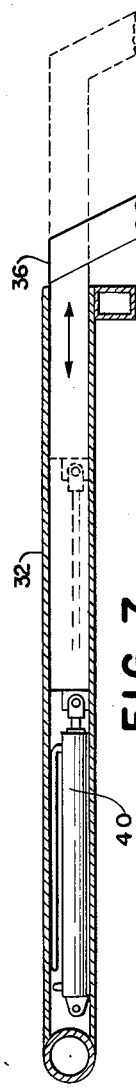

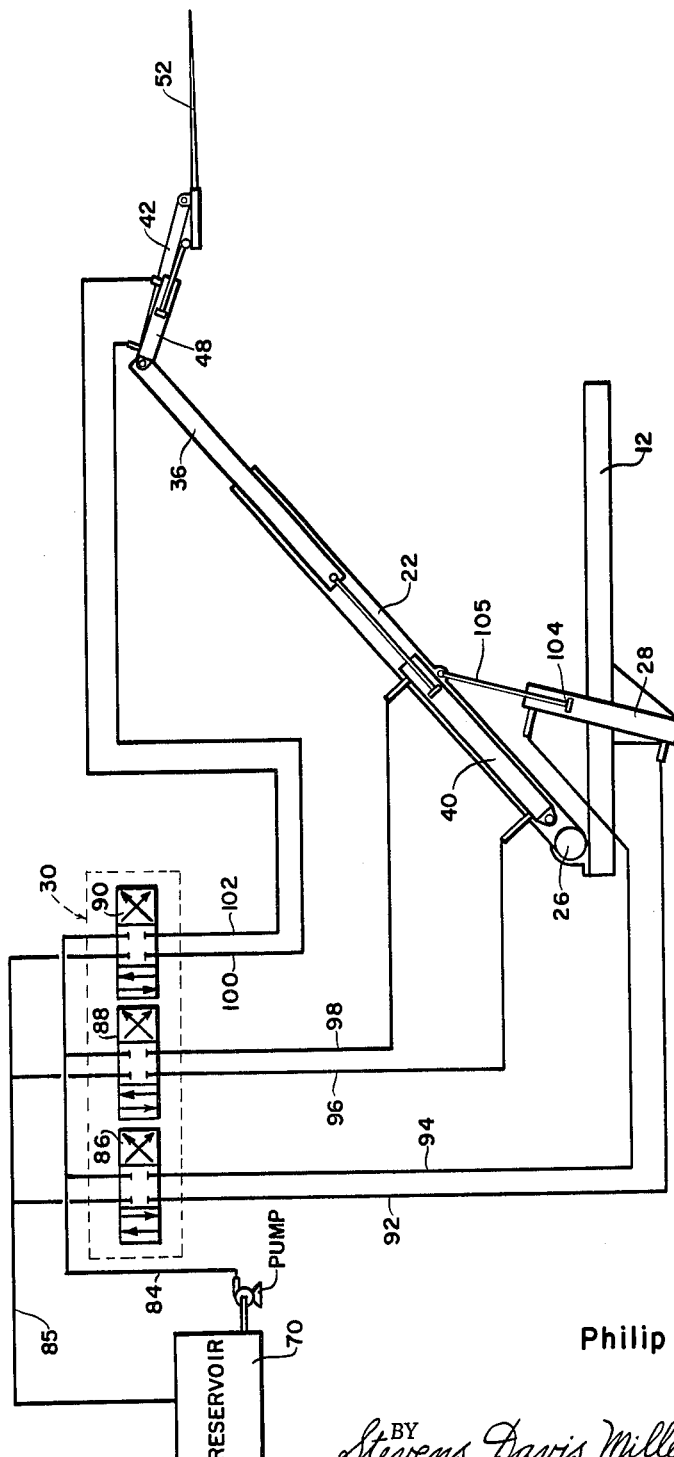

United States Patent Office 3,261,485
Patented July 19, 1966

3,261,485
LOAD HANDLING DEVICE MOUNTED ON A VEHICLE WITH A FIFTH WHEEL
Philip R. Anderson, Easton, Md., assignor to Advanced Fork-Lift Corp., Chestertown, Md., a corporation of Maryland
Filed Sept. 11, 1963, Ser. No. 308,118
6 Claims. (Cl. 214—141)

This invention relates generally to loading and unloading devices, and more particularly, to a device which may be mounted on the rear of a tractor of a tractor-trailer unit. When bulky materials, such as many types of building materials, are transported to remote construction sites there is often a problem entailed in having proper unloading equipment available to save time and money in the unloading process. Oftentimes the most desirable piece of equipment for such unloading is a fork lift truck but such trucks are not readily movable over long distances, are expensive to move and retain at a building site until needed, and have limited capabilities.

It is therefore an object of this invention to provide a type of crane-fork lift mechanism for loading and unloading trucks which may be compactly and neatly mounted on the tractor unit of a tractor-trailer combination so as to be readily available for unloading the trailer when material arrives at a building site.

Previous efforts to solve this unloading problem have involved the use of various types of unloading devices which were secured to the front of the tractor unit, but the devices have largely proved unsatisfactory because of difficulties in driver vision and danger to other vehicles on the road. Other prior art inventions have involved devices such as that disclosed in U.S. Patent No. 2,910,203 to Todd which utilizes a rear mounted truck unloader of limited capability. Devices shown in the Todd patent are pivoted from the rear of the frame of the truck, need a separate operation to set it up in position for use, and have only an up and down vertical motion of the fork operated through a cable and pulley arrangement to provide lifting. Such devices necessitate much backward and forward movement of the complete tractor in order to handle the unloading of a trailer.

It is another object of this invention, therefore, to provide a rear-end tractor mounted unloading device which requires a minimum of movement of the tractor itself while unloading.

A further object of this invention is to provide an unloading device which requires a minimum amount of set-up time before operation.

A still further object is a device of this type which has all the advantages of a fork lift coupled with the advantages of a crane.

Other objects and advantages of this invention will be apparent upon consideration of the following detailed description of a preferred embodiment thereof in conjunction with the annexed drawings wherein:

FIG. 1 is a side view of a tractor-trailer combination showing the positioning of the unloading device in its retracted position with a trailer attached;

FIG. 2 is a side view of the tractor with its attached unloading device in an elevated position along side a loaded trailer which is shown in a rear view;

FIG. 3 is a side view showing the tractor and unloading device in greater detail in a retracted position;

FIG. 4 is a partial rear view of the tractor with the hoist in retracted position;

FIG. 5 is a side view of the tractor with the hoist in an elevated and extended position;

FIG. 6 is a top view of the tractor and hoist;

FIG. 7 is a sectional view taken along line 7—7 of FIG. 6;

FIG. 8 is a sectional view taken along line 8—8 of FIG. 6;

FIG. 9 is a sectional view taken along line 9—9 of FIG. 6;

FIG. 10 is a sectional view taken along line 10—10 of FIG. 6; and

FIG. 11 is a schematic diagram of the hydraulic system of the present invention.

Briefly described, this invention, in a preferred embodiment, consists of two parallel transversely spaced hoist arms mounted on the rear of a tractor, one on each side of the fifth wheel, directly overlying the frame members and pivoted to move under hydraulic power in a vertical plane above the frame members. A pair of hoist extension arms are telescopically mounted within the hoist arms to move inwardly and outwardly also under hydraulic power. Pivotally mounted at the outward ends of these extension arms is a pair of lift forks which are also hydraulically operated. All of the hydraulic cylinders are controllable from a central point located immediately to the rear of the tractor cab.

Referring to FIGS. 1 and 2, the truck-tractor has a cab 10 mounted on its frame 12 in a conventional manner. A conventional fifth wheel 14 is used to hold the trailer 16 to the tractor for transport. Mounted on the tractor is a hoist 20, which is so positioned that it will not interfere with operation of the tractor when a trailer is attached, or with the parking gear wheels 18 of the trailer.

The hoist 20 includes hoist arms 22 and 24 (FIG. 6) which have their forward ends mounted to pivot in a vertical plane about shaft 26 mounted rearwardly of the cab 10 on the frame 12 when the hydraulic means 28 and 29 (FIG. 6) are actuated from the valve means 30. When hydraulic fluid is admitted to the cylinders, the hoist arms 22 and 24 will be elevated as is shown in FIG. 2. The hoist arms 22 and 24 are pivoted directly above the truck frame members 12 and 13 (see FIG. 10) and the re-enforcing webs 32 and 34 of the hoist arms lie directly along side the frame members when the hoist arms are in their lowered position. This construction makes for much greater rigidity and at the same time insures that each time the hoist arms are lowered they will be properly positioned directly above the truck frame members.

The hoist arms 22 and 24 together with their re-enforcing webs are held together to form an integral unit by cross-brace 33, shown in section in FIG. 9, which is welded to both the hoist arms and the webs. This brace 33 has a depressed center section to conform with the shape of the tractor frame members and permit ample clearance when connecting the trailer.

Telescopically mounted inside the hoist arms 22 and 24 are the hoist extension arms 36 and 38, more clearly shown in FIGS. 9 and 10. These extension arms are actuated to move inwardly and outwardly by using double action hydraulic cylinders positioned inside the hoist arms which are identical to cylinder 28. FIG. 7 shows one of these cylinders 40 and the mounting of the hoist extension arm 36 within the hoist arm 22. The construction of the comparable hoist arm 24 is identical. These extension arms form an important part of this invention since with them it is possible to reach out the load, pick up a bundle of material, retract the arms, then lower the material and deposit it on the ground without moving the tractor.

When it is desirable to move the load directly into place, such as when the roof trusses of FIG. 1 and FIG. 2 are unloaded, the tractor can be driven to the building with the trusses suspended from the fork lifts and elevated immediately to the top of the building by operation of the hoist arms and extension arms. If it is necessary to achieve a greater height than the length of the arms normally permit, an accessory gin pole may be fitted into one of the fork pockets. This pole may be designed to fit the particular job requirements, in the case of roof trusses a chain and hook secured to the upper end of the pole to wrap around the beams has been found adequate.

Referring to FIGS. 3 and 4 it can be seen that the extension arms 36 and 38 have downwardly extending portions 42 and 43 which terminate in pivot points 44 and 45 upon which the fork lift support cross member 66 is mounted. This cross member is provided with a plurality of fork pockets 58, 60, 62 and 64. FIG. 4 shows a rear view of these fork pockets revealing that the outboard fork pockets 58 and 60 are rigidly mounted to the cross member 66 while the inboard fork pockets 62 and 64, although fixed vertically, may be slid horizontally along the cross member 66 to adjust for various widths of load. Also shown in FIG. 4 is the cross bracing 68 which is welded in an "X" shape between the downwardly extending portions 42 and 43 of the hoist extension arms for greater rigidity. The fork lift supports are pivoted by means of a third pair of double acting hydraulic cylinders 48 and 50 which, when actuated, will move the forks 52 and 54 upwardly or downwardly in an arc. These cylinders act on the fork lift support assembly on the forward side of the pivot points 44 and 45 so that a downward movement of the cylinder pistons will cause an upward arcuate movement of the lift forks, and an upward movement of the cylinders will cause a downward arcuate movement of the lift forks. The forks may be readily detached by simply lifting the pin 56 from the fork pocket and pulling the fork out of the pocket, as shown in FIG. 8.

In a preferred embodiment of this invention it was found that hoist arms constructed of box-shaped beams of rectangular cross section approximately 6 inches high and 4 inches wide and the telescopic extension arms 36 and 38 of similar beam about 5½ inches high by 3½ inches wide were very satisfactory. These arms could also be made of round material such as 5 inch pipe and a corresponding size pipe or tubing to telescope inside it. The hoist arm re-enforcing webs 32 and 34 were made of ⅜ inch thick steel plate approximately 6 inches high and the length of the hoist arm.

In the construction of the hydraulic system conventional parts were used whenever possible, all six of the hydraulic cylinders being of the standard double acting type and connected by standard piping and hoses to a conventional valve 30. A conventional hydraulic pump is driven from the power take-off of the truck to pressurize a single supply hose which is connected to the inlets of the valve 30. This valve has three separate handles, one for each pair of hydraulic cylinders, the operation of each section of this valve is the same, e.g., when the handle is in its center position the valve is "off" and no fluid is permitted to flow in or out of the cylinder, thus holding its piston in a fixed position, when the handle is pushed forward the piston of the cylinder will move in, and when the handle is pulled back the piston of the cylinder will push out.

A conventional double action hydraulic hook-up is used where the end of the cylinder receiving fluid is under pressure, pushing the piston out while the hose from the end of the cylinder on the opposite side of the piston is connected, through the valve 30, and through a single return line to the reservoir 70. The fluid thus discharged from the cylinder is returned to the reservoir which is in turn connected to the inlet side of the pump for reuse in the system. Although the operation of only one cylinder has been described, it should be understood that the operation of all of the cylinders is identical.

As an added convenience to the operator the valve control handles are provided with handle extensions 72 which protrude into the truck cab 10 so that the hoist may be operated without the necessity of the operator leaving the truck cab. Thus, it is possible to actuate all three pairs of hydraulic cylinders from one central control point.

The numerals 74, 76 and 78 (FIG. 6) indicate six pipe T's in the hydraulic control lines to which the outlet hoses of the control valve 30 are connected. For simplicity of illustration and ease of understanding the actual hose connections have been omitted. In operation the "up" and "down" side of the valve 30 for cylinders 28 and 29 would be connected to the pair of T's labeled 74, the lines for the cylinders 40 and 41 to the pair of T's 76, and the lines for the cylinders 48 and 50 to the pair of T's 78. Thus, there would be a total of 14 hoses connected to the valve control—6 pairs from the cylinders, one discharge to the reservoir 70 and one supply hose from the pump.

The details of the hydraulic system will now be discussed in greater detail in connection with FIG. 11, a schematic diagram of the system. The hydraulic fluid flows under pressure from the pump through supply hose 84 to the inlets of each of the 3 sections of the valve 30. Each of these sections is a separate 3 position, 4 connection, closed center directional valve, shown schematically and numbered 86, 88 and 90.

When the handle for valve 86 is pulled forward, the fluid will flow from supply hose 84 through valve 86, through hose 92 to cylinder 28, moving its piston 104, connecting rod 105 and the hoist arm 22 upward. As this piston moves upward it forces the fluid in the upper part of the cylinder 28 out through hose 94, back through a connection in valve 86, through return hose 85 to the reservoir 70 where it recirculates back to the pump. When the handle for valve 86 is pushed backward, the fluid flow is in the opposite direction—out through hose 94, pushing piston 104 downward and forcing the fluid in the lower part of the cylinder 28 back through hose 92, valve 86 and return hose 85 to the reservoir 70. When the valve control handle is in its center or "off" position, the hoses 92 and 94 are closed off so that no fluid may move in or out of cylinder 28, holding its piston and the hoist arm 22 in a fixed position.

Valve 88 similarly controls cylinder 40 and extension arm 36 through hoses 96 and 98, and valve 90 controls the pivoting of lift fork 52 through cylinder 48 which receives its fluid intake and discharge through hoses 100 and 102.

Although the operation of the hydraulic system has been explained for purposes of clarity in terms of only one side of the device, i.e., one of the hoist arms, one of the extension arms and one of the lift forks, it is to be understood that the operation of the other side is identical and simultaneous with hoses 92 and 94 being connected to the pair of T's 74 (FIG. 6), hoses 96 and 98 connected to the pair of T's 76 and hoses 100 and 102 being connected to the pair of T's 78 so that both sides receive fluid at the same time to insure simultaneous operation for corresponding cylinders.

Since the adjustment by valve 90 of cylinders 48 and 50 needed to keep lift forks 52 and 54 in a horizontal plane constantly changes as the hoist arms 22 and 24 are elevated by cylinders 28 and 29 through the operation of valve 86, it is apparent that valves 90 and 86 may be interconnected by linkage between them so that for any given angle of the hoist arms the lift forks will automatically be level, that is, parallel with the ground.

In an actual unloading operation the trailer is first parked in a desirable location, the tractor is disconnected from the trailer in a conventional manner and driven along side and perpendicular to the loaded trailer, the forks 52 and 54 are slipped into the fork pockets and the securing pins dropped in place, the hoist arms are elevated, the hoist extension arms are extended outwardly toward the load, and the forks are brought up under the load to engage it. After the load is supported by the forks, the extension arms are retracted to a point where the load will clear the side of the trailer and then the hoist arms are lowered until the load comes in touch with the ground. Thus, it can be seen that through simple movement of the three valve handles the load can be easily removed from the trailer to the surface of the ground or elevated to some greater height.

In order to prevent a load, such as the roof trusses shown in FIG. 1, from tipping backward when elevated, a pocket 80 may be welded on one of the fork lift supports to hold a vertical pipe 82 which may be placed therein when needed and secured by a pin to provide the necessary support against tipping of the load.

Another extremely useful feature of this loading and unloading device is that it is also designed to be used to assist in getting the tractor out of muddy or rutted areas when the rear wheels are stuck. To accomplish this, the hoist arms are first raised part way and the lift forks are pivoted to their extreme downward position. The hoist arms are then lowered causing the forks to touch the surface of the ground. As this lowering force continues, the rear wheels of the tractor are forced to rise. After the rear wheels are elevated above the surface of the ground, the hoist extension arms are then moved outward, forcing the entire tractor to roll forward on its front wheels, being support in the rear only by the lift forks. After the tractor has been moved forward the full length of the extension arms (about 5 feet), this "rowing" process is repeated until the rear wheels are back on solid ground.

From the above description it can be seen that through the use of this invention, a simple and compact loading and unloading device may be readily incorporated into a tractor-semitrailer combination without impairing the usefulness of the tractor for other purposes. The only changes that need to be made to the tractor are the addition of the hydraulic system, elevating the fifth wheel about 5 inches above its normal position and the installation of the device of this invention previously described.

It is contemplated that the lift forks may be built with an off-set such as fork 53 (FIG. 5) or special holders to suit various types of load. It is also contemplated that a tall boom or gin pole as previously described may be used in place of the lift forks to raise a load to higher elevations, such as to the top of a building under construction. It is also contemplated that the hoist arms may be mounted to pivot in a horizontal, as well as a vertical plane, to add to the versatility of this device.

While the invention has been disclosed and described in some detail in the drawings and foregoing description, they are to be considered as illustrative and not restictive in character, as other modifications may readily suggest themselves to persons skilled in this art and within the broad scope of the invention, reference being had to the appended claims.

What is claimed is:

1. In combination with the tractor of a tractor-trailer unit, said tractor having a fifth wheel engageable by a trailer and having rear wheels and frame members extending horizontally and forwardly of said wheels, a loading and unloading device comprising hoist arm means pivoted at one end on said frame members at a point forward of said rear wheels, said hoist arm means being contiguous to said frame members and being positioned beneath said fifth wheel in an inoperative storage position, power actuating means to raise and lower said hoist arm means in an arcuate path from and towards said storage position, extension arm means slidably mounted on said hoist arm means, power actuating means to move said extension arm means inwardly and outwardly in relation to said hoist arm means, fork lift means pivotally mounted near the outward end of said extension arm means, and means to maintain said fork lift means substantially horizontal as said hoist arm means is moved arcuately upwardly or downwardly.

2. The device of claim 1 wherein said hoist arm means comprises a first pair of arms normally overlying said frame members and said extension arm means comprises a second pair of arms telescopically mounted within said first pair of arms.

3. The device of claim 1 wherein each of said power actuating means comprises at least one hydraulic cylinder.

4. In combination with the tractor of a tractor-trailer unit, said tractor having a fifth wheel engageable by a trailer and having front and rear wheels supporting a pair of longitudinal frame members, a loading and unloading device comprising a pair of integrally connected transversely spaced parallel hoist arms normally overlying said frame members and pivoted at one end on and above said frame members at a point forwardly of the rear wheels, said hoist arms being contiguous to said frame members and being positioned beneath said fifth wheel in an inoperative storage position, a first pair of double acting hydraulic cylinders to raise and lower said hoist arms in a vertical plane from and towards said inoperative position, a pair of integrally connected extension arms telescopically mounted within said hoist arms and having downwardly extending portions at their outward ends, a second pair of double acting hydraulic cylinders to move said extension arms inwardly and outwardly in relation to said hoist arms, a pair of lift forks pivotally mounted near the outward end of said extension arms, and a third pair of double acting hydraulic cylinders to pivot said lift forks in relation to said extension arms in a vertical plane.

5. The combination comprising a tractor of a tractor-trailer unit, said tractor having front and rear wheels supporting longitudinal frame members, said tractor having a fifth wheel disposed between said frame members and engageable by trailer, a loading and unloading device comprising a pair of integrally connected transversely spaced parallel hoist arms, means pivotally connecting one end of said hoist arms on said frame members at a point forwardly of said rear wheels, said hoist arms in an inoperative storage position thereof being disposed contiguous to and parallel to said frame members on opposite sides of and beneath said fifth wheel, first hydraulic means to raise and lower said hoist arms, a pair of integrally connected extension arms telescopically mounted within said hoist arms, second hydraulic means to move said extension arms inwardly and outwardly in relation to said hoist arms, load engaging means pivotally mounted near the outward end of said extension arms, and third hydraulic means to pivot said load engaging means in relation to said extension arms in a vertical plane.

6. The combination of claim 5, further comprising reinforcing web means secured to the outer sides of said hoist arms and depending therefrom, said reinforcing web means in the storage position of said hoist arms lying along-side of said frame members.

References Cited by the Examiner

UNITED STATES PATENTS

| | | | |
|---|---|---|---|
| 2,459,506 | 1/1949 | Dempster | 298—22 |
| 2,501,112 | 3/1950 | Webster | 214—140 |
| 2,682,957 | 7/1954 | Holmes | 280—425 |
| 2,788,139 | 4/1957 | Tendresse | 214—141 |
| 2,791,341 | 5/1957 | Michaels et al. | 214—141 |
| 2,900,099 | 8/1959 | Cook | 214—674 |
| 2,990,072 | 6/1961 | Mindrum | 214—141 X |
| 3,033,400 | 5/1962 | Smith | 214—672 |
| 3,045,853 | 7/1962 | Card | 214—672 |
| 3,054,522 | 7/1962 | Peck | 214—674 |
| 3,070,244 | 12/1962 | Lull | 214—140 |
| 3,092,367 | 6/1963 | Selby | 214—672 X |

FOREIGN PATENTS 483,501   5/1952   Canada.

GERALD M. FORLENZA, *Primary Examiner.*

R. B. JOHNSON, *Assistant Examiner.*